J. E. ASHBAUGH & W. R. KING.
TIRE APPLYING AND REMOVING TOOL.
APPLICATION FILED JUNE 28, 1916.
1,233,012. Patented July 10, 1917.
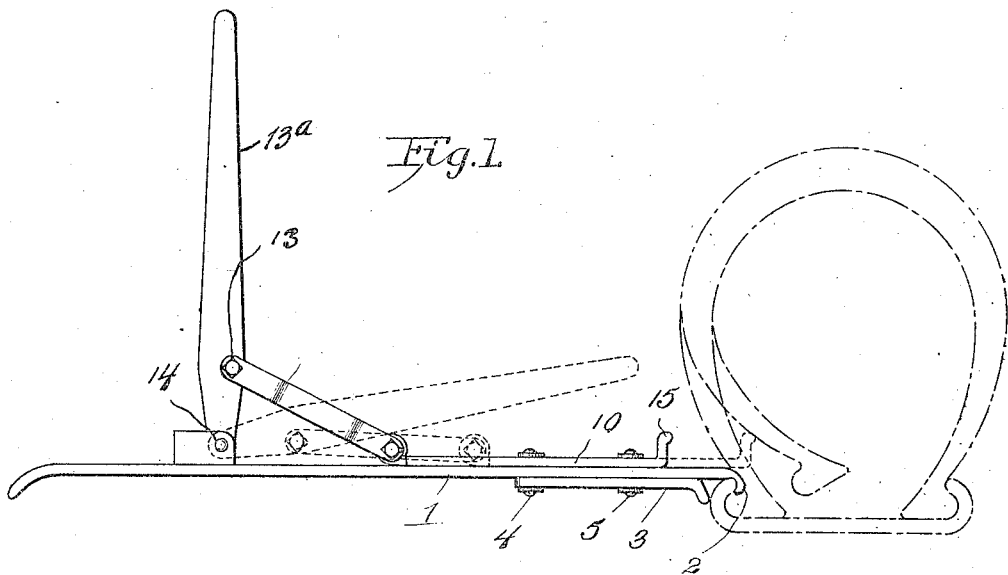
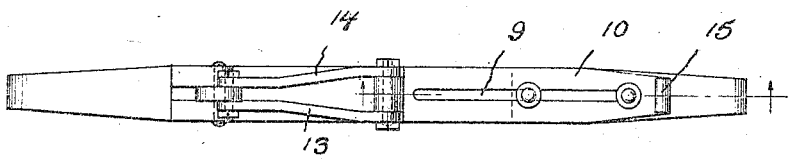
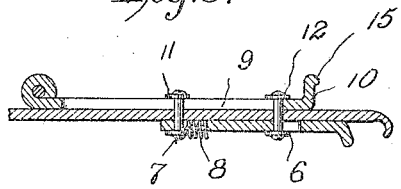
WITNESSES
INVENTOR
John E. Ashbaugh,
William R. King.
By Victor J. Evans
ATTORNEYS

UNITED STATES PATENT OFFICE.

JOHN ELMER ASHBAUGH AND WILLIAM ROSS KING, OF CLARKSBURG, PENNSYLVANIA.

TIRE APPLYING AND REMOVING TOOL.

1,233,012.  Specification of Letters Patent.  Patented July 10, 1917.

Application filed June 28, 1916. Serial No. 106,484.

*To all whom it may concern:*

Be it known that JOHN ELMER ASHBAUGH and WILLIAM ROSS KING, citizens of the United States, residing at Clarksburg, in the county of Indiana and State of Pennsylvania, have invented new and useful Improvements in Tire Applying and Removing Tools, of which the following is a specification.

This invention relates to tire tools and one of the objects is to provide means for assisting in the removal of pneumatic tires from vehicle wheels and to provide means whereby this may be accomplished in an expeditious and easy manner.

Another object is to provide a tool which may be easily carried in a kit.

In the drawings:—

Figure 1, is a perspective view of a tool constructed in accordance with our invention.

Fig. 2, is a fragmentary bottom view of the rim clamping jaw, and,

Fig. 3, is a longitudinal sectional view through the engaging portion of the tool.

Referring now to the drawings by numerals of reference 1, designates a bar or member having a rim engaging jaw, at one end and a handle at the other. The rim engaging jaw is illustrated as consisting of the inwardly curved or hooked end 2, and the sliding member 3. The sliding member of the jaw is secured to one face of the bar 1, by fastening devices 4 and 5 in slots 6 and 7 in one of which is a spring 8, one end of which bears against the fastening device 4 and the other against the edge of the slot 7.

These fastening devices pass through the bar 1, and through the elongated slot 9 in the sliding tire engaging member 10, the projecting ends being provided with washers 11 and 12.

$13^a$, is an operating lever pivoted at 14 and connected to one end of the sliding tire engaging member 10 by the links 13 and 14.

15, is a lip or projection disposed in an opposite direction to the rim engaging jaw and adapted to exert pressure against the tire to push it away from the rim.

If the parts are assembled as shown in Figs. 1, 2 and 3 and it is desired to remove the tire, the jaw consisting of the members 2 and 3 will be caused to engage the edge of the rim and by moving the lever $13^a$ in a forward direction the portion 15 on the member 10 will exert pressure against the tire adjacent to the rim and move its edge out of the recess of the said rim whereby the tire will be easily removed. In like manner the tire may be applied by causing the members 2 and 3 to engage the outer edge of the rim and by moving the lever $13^a$ forward the bead portion will be forced over the rim into the groove of the member adapted to receive it.

By reference to Figs. 2 and 3 it will be observed that there is a spring between one of the fastening devices and the slot 7. The spring is stiff enough so that the jaw 3 will be rigid although it will give enough to allow a slight movement to be imparted to said member when the jaw members are fitted over the rim.

What we claim is:—

A tire tool, comprising a bar having a rigid jaw member and a sliding jaw member, fastening devices for securing the sliding jaw member, a sliding tire-engaging member and an operating lever pivoted to the bar and connected to the sliding member.

In testimony whereof we affix our signatures in presence of two witnesses.

JOHN ELMER ASHBAUGH.
WILLIAM ROSS KING.

Witnesses:
H. P. SANDLES,
R. A. HARBISON.

Copies of this patent may be obtained for five cents each, by addressing the "Commissioner of Patents, Washington, D. C."